United States Patent [19]

Park et al.

[11] Patent Number: 5,682,380
[45] Date of Patent: Oct. 28, 1997

[54] HARD-HANDOFF CONTROL METHOD FOR A CDMA (CODE DIVISION MULTIPLE ACCESS) MOBILE SWITCHING CENTER

[75] Inventors: Hyun-Hwa Park; Dong-Su Jung; Dae-Sik Kim; Jee-Hwan Ahn, all of Daejeon, Rep. of Korea

[73] Assignee: Electronics and Telecommunications Research Institute, Daejeon, Rep. of Korea

[21] Appl. No.: 544,737

[22] Filed: Oct. 18, 1995

Related U.S. Application Data

[63] Continuation-in-part of Ser. No. 359,199, Dec. 19, 1994, abandoned.

[30] Foreign Application Priority Data

Nov. 30, 1994 [KR] Rep. of Korea .............. 94-32098

[51] Int. Cl.$^6$ ............... H04J 3/02; H04J 13/00; H04Q 7/22
[52] U.S. Cl. .............. 370/331; 370/335; 379/60; 455/33.2
[58] Field of Search ............ 370/329, 331, 370/335; 455/33.1, 33.2, 33.4; 379/59, 60

[56] References Cited

U.S. PATENT DOCUMENTS

| | | | |
|---|---|---|---|
| 5,218,715 | 6/1993 | Leslie et al. | 455/33.2 |
| 5,278,892 | 1/1994 | Bolliger et al. | 379/60 |
| 5,305,308 | 4/1994 | English et al. | 370/60 |
| 5,384,826 | 1/1995 | Amitay | 379/60 |
| 5,386,459 | 1/1995 | Schatz et al. | 379/60 |
| 5,548,812 | 8/1996 | Padovani et al. | 455/33.2 |

OTHER PUBLICATIONS

IEEE, ©1993, pp. 839–845, entitled "Handoff Management and Performance for Wireless Access Using Metropolitan Area Networks" by Sanjiv Nanda, et al, AT&T Bell Laboratories, Crawfords Corner Road, Holmdel, New Jersey 07733.

XIV International Switching Symposium (ISS), Oct. 1992, vol. 1, pp. 108–112, entitled "Switching Handovers in Microcellular Mobile Networks: An Architectural Evolution", by Paul Simmons and Michel Mouly, Matra Communication, France.

"Pan–European Digital Cellular System for Mobile Telephones," P. Duplessis et al, Commutation & Transmission No. 2, 1986.

*Primary Examiner*—Douglas W. Olms
*Assistant Examiner*—Min Jung
*Attorney, Agent, or Firm*—Antonelli, Terry, Stout & Kraus, LLP.

[57] ABSTRACT

A hard-handoff control method for a CDMA mobile switching center includes the steps of detecting an original target switching center number of a switching center for managing a target cell of the handoff request message; converting the speech channel of the mobile station to second switching center areas by determining that the mobile station shifts from the first anchor station in the first switching center to a second anchor station if the target switching center number detected is same as its own switching center number; determining the position of the switching center areas where the mobile station opens a speech path if the target switching center number detected is different from its own switching center original number; converting the speech channel of the mobile station to the second switching center areas if the first switching center is determined as the anchor switching center; comparing the target switching center number with the anchor switching center number if the first switching center is not determined as the anchor switching center; converting the speech channel of the mobile station to the anchor switching center areas if the target switching center number is same as that of the anchor switching center; converting the speech channel of the mobile station to the target switching center areas by directly connecting inner communication paths between the target switching center and the anchor switching center if the target switching center number is different from the anchor switching center number.

6 Claims, 8 Drawing Sheets

HARD-HANDOFF CONTROL METHOD FOR A CDMA (CODE DIVISION MULTIPLE ACCESS) MOBILE SWITCHING CENTER

CROSS REFERENCE TO RELATED APPLICATION

This is a Continuation-in-Part application of U.S. Ser. No. 08/359,199, filed Dec. 19, 1994, now abandoned, entitled "Hard-Handoff Control Method for a CDMA (Code Division Multiple Access) Mobile Switching Center", which application is incorporated herein by reference in its entirety.

BACKGROUND OF THE INVENTION

1. Field of the Invention

The present invention relates to a hard-handoff control method for a CDMA (code division multiple access) mobile switching center, and more particularly to a hard-handoff control method in which a speech path can be ensured at a minimum distance when a subsequent hard-handoff occurs.

2. Description of the Prior Art

Generally, handoff is needed due to the mobility of a subscriber and occurs when a current call is switched to a newly ensured channel when the signal strength calculated a a base station or mobile station is under a prescribed value resulting in lowered speech quality. Since the speech quality depends on the handoff, in a mobile switching center, the system has been designed that the assignment of a handoff speech path to a new base station is required in order to ensure a speech path which is able to maintain a current call without disconnecting it, and the call is switched to a base station of a shifted area managed by a mobile station without having an effect on the conversation of a mobile subscriber by using the ensured speech path. As a result, the handoff control method has been developed. Also, if handoff of the mobile station is implemented by another mobile switching center, a trunk line is additionally constructed.

According to the conventional control method of switching speech paths, which is designed as handoff control method described above, in a speech path connecting system of a switching type used in an analog mobile communication system, if handoff occurs due to mobility of the mobile station during a busy state, a previous speech path is disconnected before connection to a new speech path is effected. Hence, conversation cannot be conducted during a time interval which may be sensed by a subscriber, thereby causing the subscriber to be inconvenienced. In order to prevent such inconvenience, in a speech path connecting system of a combination type, since the previous speech path is disconnected after a handoff processing is completed, i.e. after a new speech path is connected, the previous and new speech paths are simultaneously connected to perform handoff and good speech quality can be maintained.

Among the mobile communication systems of the combination type, there is a GSM (Global System for Mobile Communication) used in Europe, which employs a call mixer circuit for the speech path connecting system of a combination type. However, system facilities for use in a conference call, etc. are wasted. In a CDMA system, soft-handoff processing is performed to connect the better of the two previous and new speech paths, thereby obtaining the best speech quality. However, if the frequency between the two differs, it is difficult to perform the soft-handoff processing and a hard-handoff processing should be implemented instead. Also, the CDMA system has a problem that the transmission of data is sequentially performed through switching centers if the subsequent handoff forward occurs.

The hard-handoff controlled by a mobile switching center when handoff occurs between base stations controlled by different mobile switching centers is called forward handoff. There is a system for processing secondary handoff having the same form as a forward handoff of primary handoff, which secondary handoff is generated when a mobile subscriber shifts his/her position to a region managed by another mobile switching center after the occurrence of the primary handoff between mobile switching centers. However, there are disadvantages in that a service switching center should receive corresponding data from a visitor location register (VLR) of an anchor mobile switching center which sets an initial call in order to perform additional service generated after handoff or provide service from the anchor mobile switching center. This results in that the corresponding data are transmitted/received through several switching centers when the mobile subscriber shifts using a plurality of cells managed by any switching centers, thereby lowering the efficiency of the system.

SUMMARY OF THE INVENTION

It is an object of the invention to provide a hard-handoff control method for changing a previous speech path to a new speech path without having a negative effect on a switching of the other subscriber and without lowering speech quality by setting a switching center internal path by use of a front junctor positioned before a time switch of a mobile subscriber.

It is another object of the invention to provide a speech path construction method for minimizing a speech path by processing handoffs between the anchor and final mobile switching centers without an intermediate mobile switching center when performing successive handoffs to another mobile switching center after handoff processing between two mobile switching centers.

In accordance with an aspect of the invention, a hard-handoff control method in the mobile switching centers by a handoff request message of a mobile station for shifting a plurality of switching centers in the mobile communication system which applies a code dividing multi-access method in order to assign the speech channels of the mobile station for dividing the anchor station areas into predetermined cells and shifting each of the cells, after dividing wireless speech service areas into predetermined switching center areas and then dividing the switching center areas into predetermined anchor station areas includes the steps of: a first step for detecting an original number (target switching center number) of a switching center for managing a target cell of the handoff request message, by a first switching center receiving the handoff request message of which any mobile station generates by shifting from first switching center areas to second anchor station areas, through the corresponding base station; a second step for converting the speech channel of the mobile station to the second switching center areas by determining that the mobile station shifts from the first anchor station in the first switching center to the second anchor station if the target switching center number detected in the first step is the same as its own switching center number; a third step for determining the position of the switching center areas (anchor station) where the mobile station first opens a speech path if the target switching center number detected in the first step is different from its own switching center original number; a fourth step for converting the speech channel of the mobile station to the second switching center areas if the first switching center in the third step is determined as the anchor switching center; a fifth step for comparing the target switching center number with the anchor switching center number if the first switching center in the third step is not determined to be the anchor switching center; a sixth step for converting the speech channel of the mobile station to the anchor switching center areas if the target switching center number in the fifth step is the same as that of the anchor switching center; a seventh step for converting the speech channel of the mobile station to the target switching center areas by directly connecting inner communication paths between the target switching center and the anchor switching center if the target switching center number is different from the anchor switching center number.

BRIEF DESCRIPTION OF THE DRAWINGS

For a better understanding of the invention and to show how the same may be carried into effect, reference will now be made, by way of example only, to the attached drawings, in which.

DETAILED DESCRIPTION OF THE PREFERRED EMBODIMENT

Figure 1:
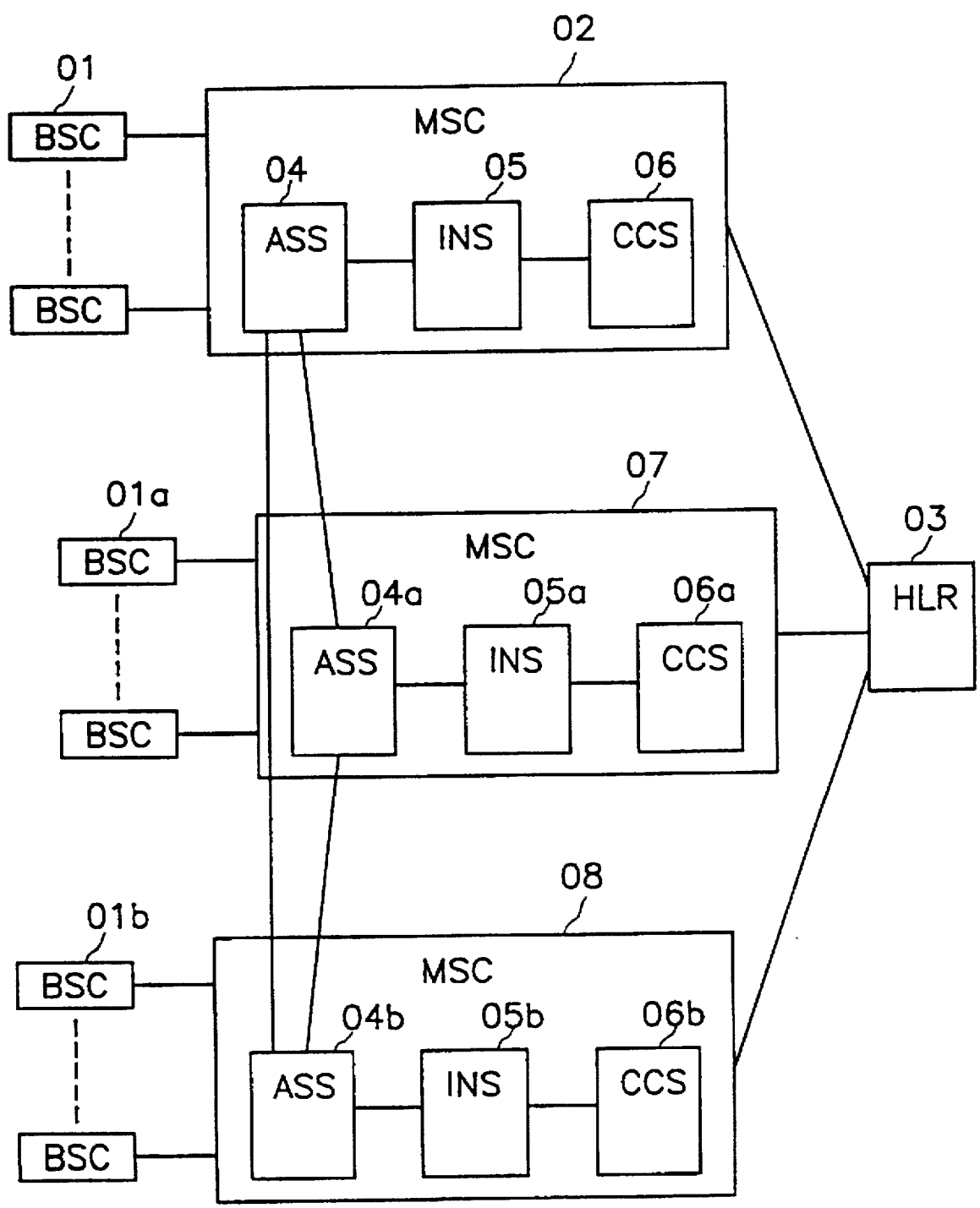
FIG. 1 is a block diagram showing a digital cellular mobile communication system applied to the present invention.

Referring to FIG. 1, a digital cellular mobile communication system includes a plurality of base station controllers (BSCs) 01, 01a, 01b; an anchor mobile service switching center (MSC) 02 for providing line switching service to subscribers and implementing location registration, handoff, paging, and a simple handoff or switching time hard handoff; a service mobile switching center 07 for implementing the same function as the mobile service switching center and implementing forward handoff, backward handoff and handoff for a third switching center by switching data to the mobile service switching center 02; a object mobile service switching center 08 for substantially implementing handoff for the third switching center in accordance with the request of the mobile service switching center 02, and a home location register 03 for permanently storing/managing mobile subscriber data. The MSCs 02, 07, 08 have an access switching subsystem (ASS) 04, 04a, 04b, an interconnection network subsystem (INS) 05, 05a, 05b, and central control subsystem (CCS) 06, 06a, 06b.

The MSCs 02, 07, 08 respectively represent differences at their corresponding switching centers in accordance with an anchor center, service, and object. That is, the anchor mobile service switching center corresponds to a switching center which maintains an original speech path by any mobile station. The object mobile switching center includes an MSC for processing the handoff when a MSC managing the target cell in the course of switching of position of the mobile station is different from the MSC managing the original cell. When the handoff is completed, the MSC is referred to as a service mobile switching center. In other words, the service mobile switching center includes a switching center for managing a cell receiving a speech service by the mobile station. It is described assuming that the mobile station has shifted from the first base station controller 01 to the third base station 01b.

The ASS 04, 04a, 04b each include subscriber and trunk matching equipment, a time switch, various signal units, etc. and implement most call processing functions and maintenance thereof. The INS 05, 05a, 05b perform centralized functions among the call processing functions, such as number translation, route control and space switch connection. The CCS 06, 06a, 06b perform management, maintenance, charge and statistics of the system, process location registration of a mobile subscriber, and store/administer subscriber data. The ASS (not shown) for a mobile subscriber (ASS-M) implements a call processing function for a mobile subscriber, handoff and movement management functions. The ASS for a trunk (ASS-T) matches a MSC with a fixed network switching center and processes a call processing function for a trunk.

In the CDMA communication system as described above, the hard handoff control method according to the present invention will be described with reference to the accompanying drawings.

Figure 2:
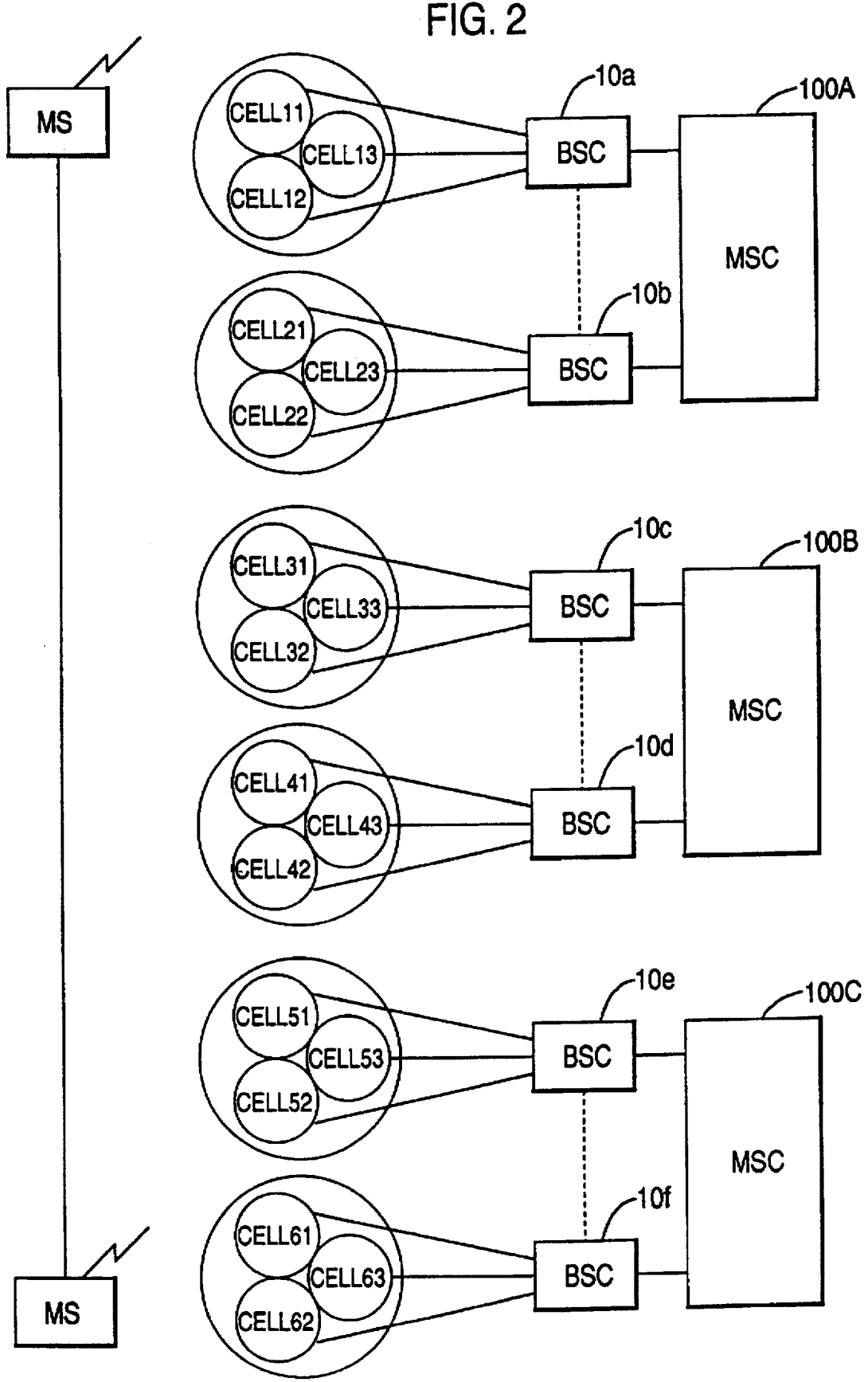
FIG. 2 is a construction view of a general mobile communication system network.

FIG. 2 is a construction view of a general mobile communication system network. Referring to FIG. 2, the mobile station requests the handoff in order to shift the speech path to a cell having a field intensity more than that of current cell which manages the current speech path during measuring the field intensity of peripheral cells receiving data in the current position. Thus, the kinds of handoff may be divided into five different types when the mobile station requests the handoff.

Now, the handoff control methods for respective handoffs according to the present invention will be described.

Case 1

When the mobile station in a busy state in a first cell (cell 11) among cells of a first base station 10a shifts to a second cell (cell 12), the handoff request is processed at the first base station 10a by itself since it corresponds to the shift between cells in the service areas by the base station's own management. The first base station 10a prevents the first switching center 100A from implementing the control operation according to the handoff. Generally, it is called a soft handoff and it is not considered in the present invention.

Case 2

When the mobile station during a busy state in any cell among cells of the first base station 10a, i.e., in the first cell to third cell (cell 11–cell 13) shifts to a cell of the second base station 10b, for example, a fourth cell (cell 21), the first base station 10a transmits the handoff request received from the mobile station to the first switching center 100A since the corresponding mobile station is out of its own service areas. At this time, the first switching center 100A detects a target cell number where the corresponding mobile station intends to shift from the handoff request data to be input from the first base station 10a.

Generally, a cell number consists of a network number, switching number, a base station number, and a cell discriminating number (that is, cell number=network number+ switching number+base station number+cell discriminating number).

The first switching center 100A for detecting the target cell number, as described above, processes a BSC handoff by determining the handoff of the base station in the same switching center service areas since the switching center is the same as its own original number.

Case 3

When the mobile station shifts from the fifth cell (cell 22) formed of the speech path to the seventh cell (cell 31), that is, from the service areas of the first switching center 100A to the service areas of the second switching center 100B, the handoff request is transmitted to the first switching center 100A through the second base station 10b which manages the fifth cell (cell 22).

The first switching center 100A detects a target cell where the corresponding mobile station intends to shift from the input handoff request data, that is, detects the seventh cell (cell 31). It determines the handoff type as a switching time handoff, that is, forward handoff, since the switching center number is different from its own original number. Thereafter, the first switching center 100A requests the handoff of the corresponding mobile station for the second switching center 100B.

Case 4

When any mobile station shifts from the service areas of the first switching center 100A to the service areas of the second switching center 100B, that is, from the fifth cell (cell 22) to the seventh cell (cell 31), and the mobile station on a busy line at the handoff-forward type shifts from the seventh cell (cell 31) to the fifth cell (cell 22) or any service cell of the first switching center 100A, the handoff request generated in the mobile station is transferred to the second switching center 100B through the third base station 10c which manages the seventh cell (cell 31).

The second switching center 100B detects a target cell where the corresponding mobile station intends to shift from the input handoff request data, that is, detects the fifth cell (cell 22) number. At this time, since the second switching center 100B recognizes the base switching center number at the time of the handoff-forward request of the mobile station, and then detects the switching number is not the same as its own original number but is the same as the base switching center number, the handoff type is determined to be a backward handoff of the switching time handoff. As a result, the second switching center 100B requests the handoff of the corresponding mobile station for the base switching center, that is, the first switching center 100A.

Case 5

When the backward handoff such as case 3 repeats, that is, the mobile station begins speech from the service area of the first switching center 100A and then shifts to the service area of the second switching center 100B, the first switching center 100A becomes the base switching center and the second switching center 100B becomes the object switching center, so that forward handoff is performed.

Sequentially if the mobile station shifts from the second switching center 100B to the third switching center 100C, the second switching center 100B becomes a service switching center and the third switching center 100C becomes an object switching center, so that the forward handoff is operated.

If the forward handoff is performed many times, the second switching center 100B detects the switching center number from the target cell where the corresponding mobile station intends to shift according to the handoff request generated as the corresponding mobile station shifts to the third switching center 100C. At this time, the second switching center 100B recognizes the base switching center number during the forward handoff request of the mobile station and then determines the handoff type as the handoff of the third switching center among the handoffs of the switching centers since the switching center number is different from its own original number and also from the recognized base switching center number.

The handoff types of Case 2 to Case 5 among the above described handoffs is the hard handoff type according to the present invention. Each of handoff types may be generated in many types depending on the circumstances. In addition, when generating the forward handoff or the backward handoff, the handoff between the base stations or between cells may be generated. It is recognized that the specific switching center is not limited to only the base, service and object.

The handoff control method according to the present invention for each of the cases as described above will be described with reference to the accompanying drawings.

Figure 3:
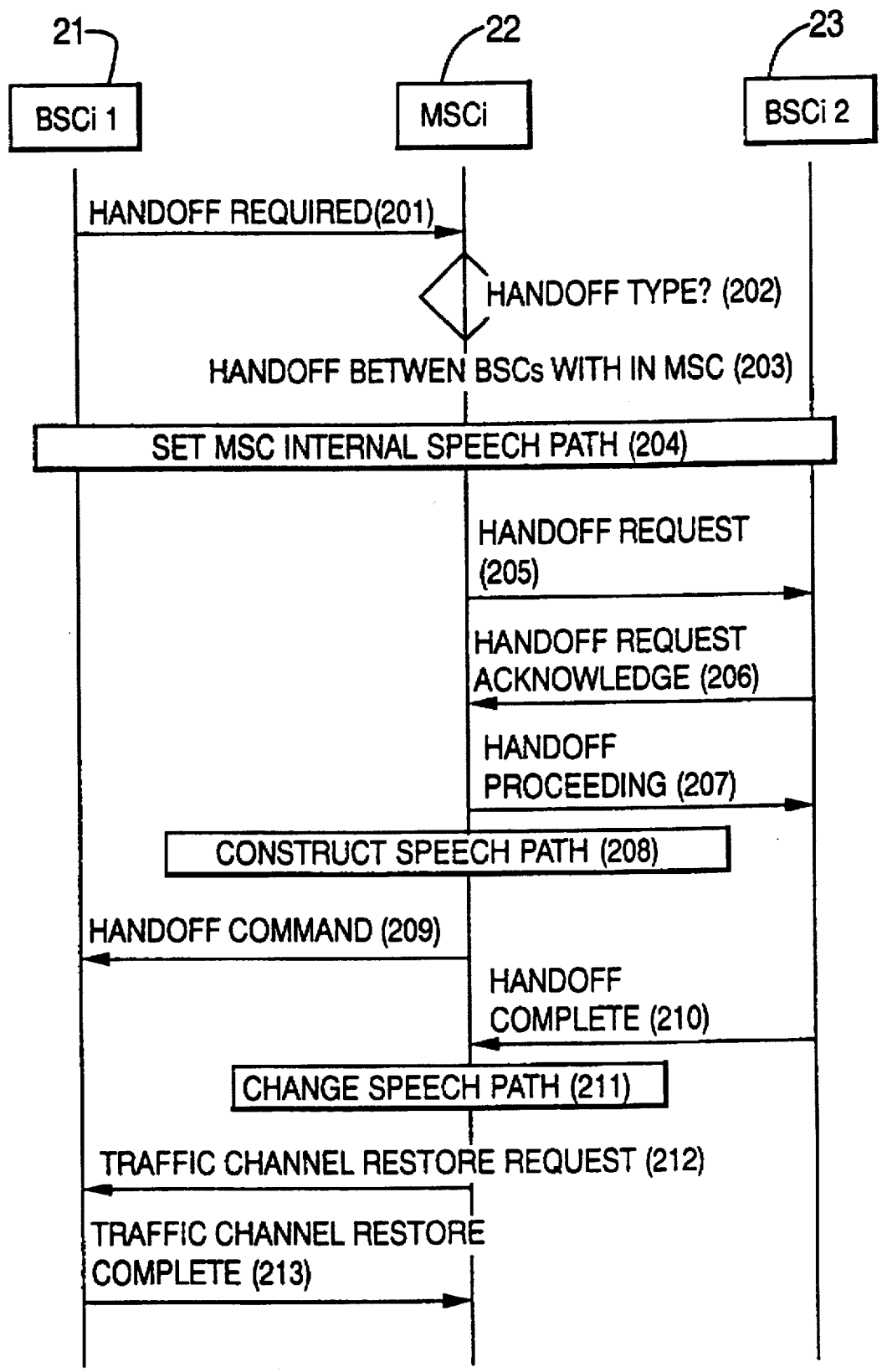
FIG. 3 is a flow chart showing the steps of handoff generated between base stations within a mobile switching center according to the present invention.

FIG. 3 is a flow chart according to case 2 as described above, which illustrates a handoff procedure generated between BSCs within a MSC. If a mobile station shifts its location during a busy state, that is the handoff is generated, a service BSC (BSCi1) 21 transmits a handoff request message to a service MSC (MSCi) 22 (step 201). If the handoff request message is received from the BSCi 21, the MSCi 22 analyzes a handoff type (step 202). If the handoff type is handoff between BSCs within the MSC (step 203), the MSCi 22 sets a MSC internal speech path using a front junctor of the ASSM (step 204) so that a change of a time slot connected to the BSC does not have an effect on a space switch or a time switch of the other subscriber. The MSCi 22 transmits the handoff request message to a handoff target BSC (BSCi2) 23 (step 205). If a handoff request acknowledge message is received from the BSCi2 23 (step 206), the MSCi 22 transmits a handoff proceeding message to the BSCi2 23 when a traffic channel is able to established (step 207). Successively the MSCi 22 constructs a new speech path (step 208) and transmits a handoff command message to the BSCi1 21 (step 209). If a handoff complete message is received from the BSCi2 23 (step 210), the MSCi 22 changes a previous speech path to a new speech path (step 211). The MSCi 22 transmits a traffic channel restore request message to the BSCi1 21 (step 212). If a traffic channel restore complete message is received from the BSCi1 21 (step 213), the handoff procedure is completed.

Figure 4:
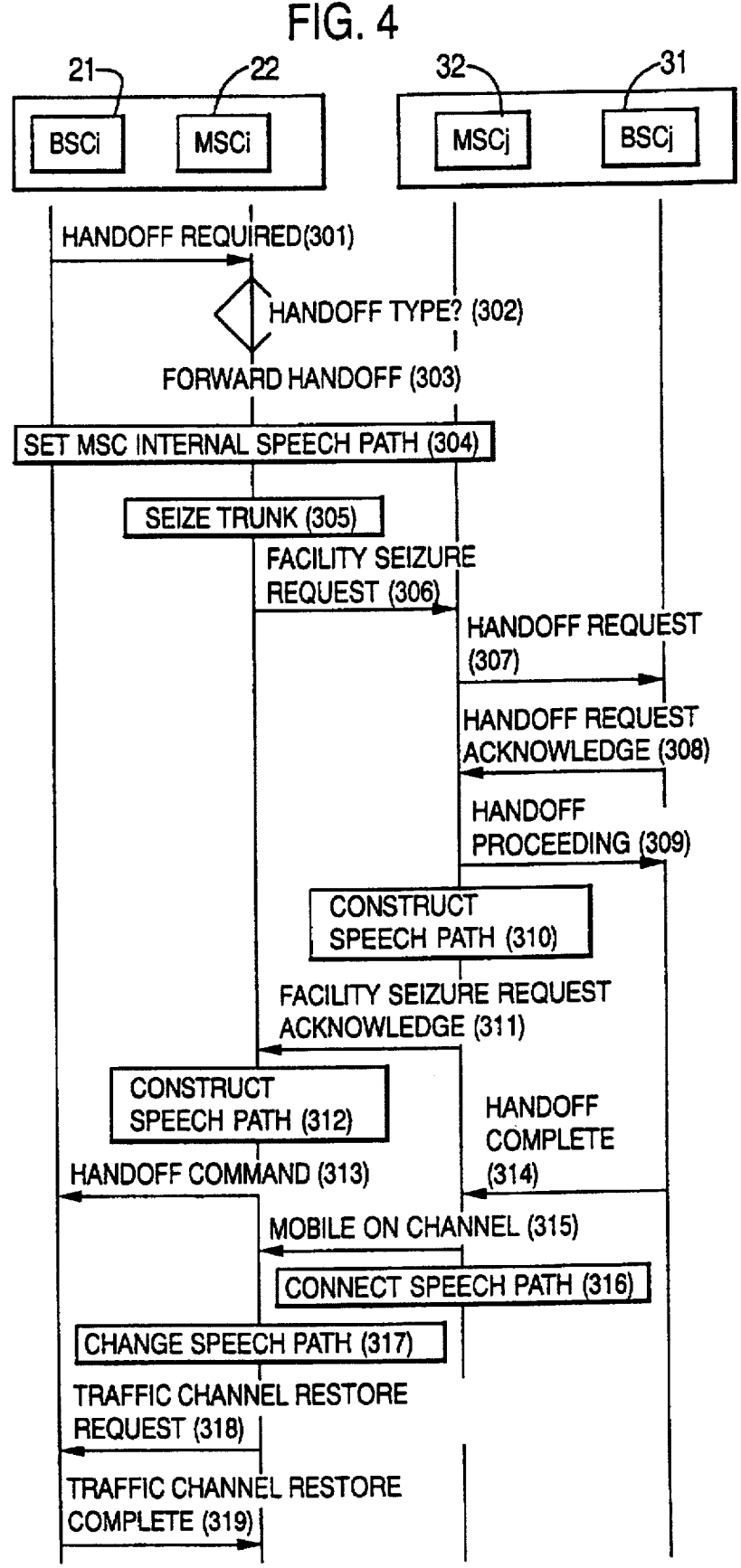
FIG. 4 is a flow chart showing the steps of a handoff forward according to the present invention.

FIG. 4 shows a forward handoff procedure and a message flow between network elements according to the case 3 as described above. The forward handoff is generated when a mobile station during a busy state shifts its position from a MSC which is in service to another MSC which is to perform the handoff. If a handoff request message is received from a service BSC (BSCi) 21 (step 301), a service MSC (MSCi) 22 analyzes the handoff type (step 302). If the handoff type is forward handoff in which the MSCi 22 is an anchor MSC in which an initial call is set (step 303) and if handoff is initial handoff, the MSCi 22 sets a MSC internal speech path (step 304). If there is a previous handoff between BSCs, step 304 is omitted. The MSCi 22 seizes a trunk with a handoff target MSC (MSCj) 32 (step 305), and transmits a facility seizure request message to the MSCj 32 (step 306). The MSCj 32 transmits the handoff request message to a handoff target BSC (BSCj) 31 (step 307). If a handoff request acknowledge message is received from the BSCj 31 (step 308), the MSCj 32 transmits a handoff proceeding message to the BSCj 31 when the traffic channel can be established. The MSCj 32 constructs a speech path with the BSCi 31 (step 310) and transmits a facility seizure request acknowledge message to the MSCi 22 (step 311).

If the facility seizure acknowledge message is received, the MSCi 22 constructs a speech with the MSCj 32 and transmits a handoff command message to the BSCi 21 (step 313). If a handoff complete message is received from the BSCj 31 (step 314), the MSCj 32 transmits a radio channel seizure message to the MSCi 22 (step 315) and connects a speech path with the BSCj 31 (step 316). The MSCi 22 changes a previous speech path to a new speech path (step 317) and transmits a traffic channel restore request message to the BSCi 21 (step 318). If a traffic channel restore complete message is received (step 319), the handoff forward procedure is completed.

Figure 5:
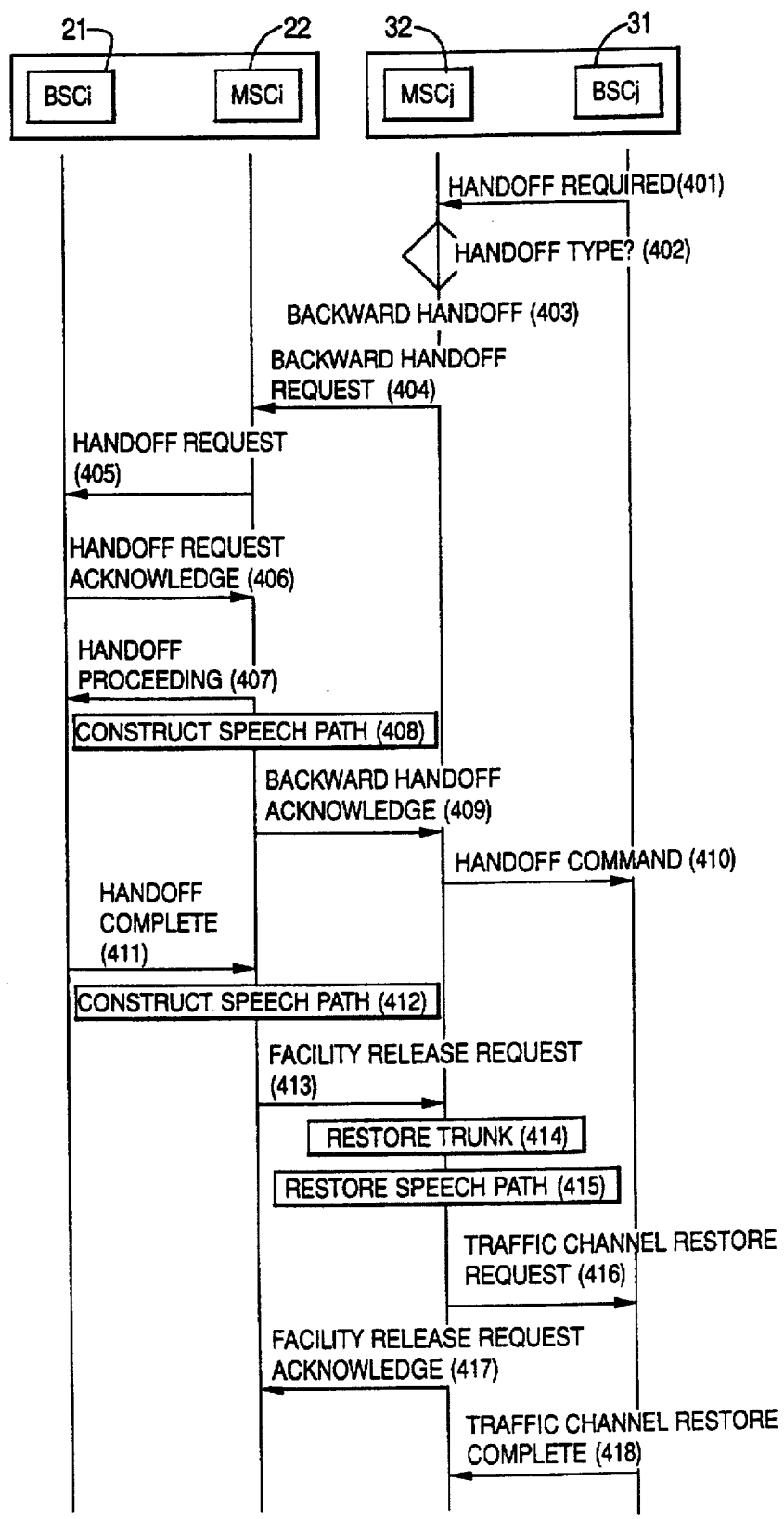
FIG. 5 is a flow chart showing the steps of a handoff backward according to the present invention.

FIG. 5 shows a backward handoff procedure and a message flow between network elements according to the case 4 as described above. Backward handoff is generated when a mobile station returns to a region of a MSC just before a shift to current location after handoff forward is implemented. If a handoff request message is received from the service BSC (BSCj) 21 (step 401), a service MSC (MSCj) 22 analyzes a handoff type (step 402). If the handoff type is backward handoff (step 403), the MSCj 22 transmits a request message to a handoff target MSC (MSCi) 12 (step 404) and the MSCi 12 transmits the handoff request message to a handoff target BSC (BSCi) 11 (step 405). If a handoff request acknowledge message is received (step 406), the MSCi 12 transmits a handoff proceeding message to the BSCi 11 (step 407) and constructs a speech path with the BSCi 11 (step 408). If a backward handoff acknowledge message is received from the MSCi 12 (step 409), the MSCj 22 transmits a handoff command message to the BSCj 21 (step 410).

If a handoff complete message is received from the BSCi 11 (step 411), the MSCi 12 connects a new speech path (step 412) and transmits a facility release request message to the MSCj 22 (step 413). If the facility release request message is received, the MSCj 22 restores a trunk between MSCs (step 414) and restores a speech path with the BSCj 21 (step 415). Thereafter, the MSCj 22 transmits a traffic channel restore request message to the BSCj 21 (step 416) and transmits a facility release request acknowledge message to the MSCi 12 (step 417). If a traffic channel restore complete message is received from the BSCj 21, the backward handoff procedure is completed.

Figure 6:
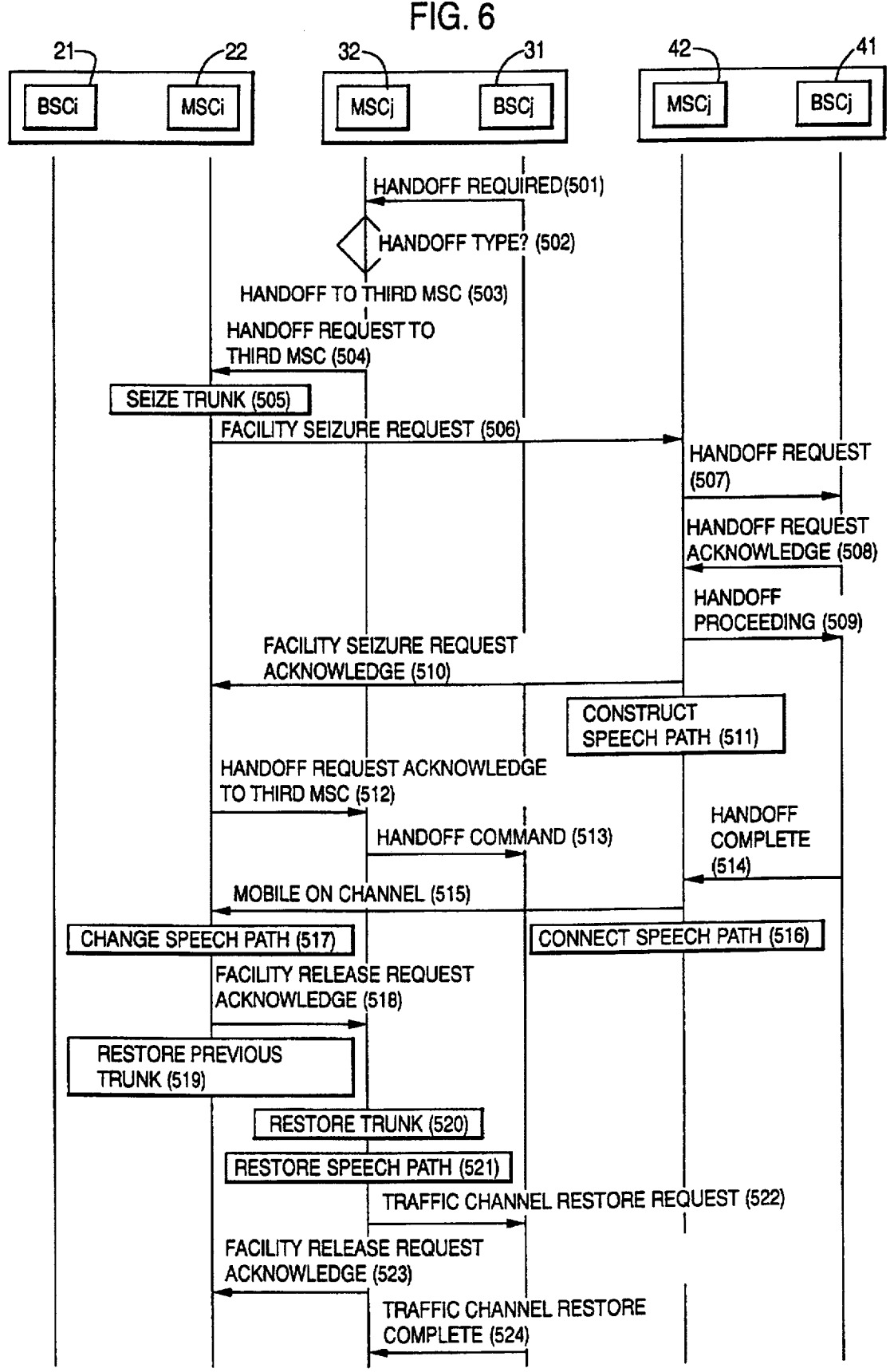
FIG. 6 is a flow chart showing the steps of handoff to a third system having a minimum route according to the present invention.

FIG. 6 shows a handoff procedure for a third system and a message flow between network elements according to case 5 as described above. If a handoff request message is received from a service BSC (BSCj) 21 (step 501), a service MSC (MSCj) 22 analyzes the handoff type (step 502). If the handoff type received from the BSC after handoff between MSCs is a handoff from a third system (step 503), the MSCj 22 transmits a handoff message for a third system to an anchor MSC (MSCi) 12 which sets an initial call (step 504). The MSCi 12 seizes a trunk with a handoff target MSC (MSCk) 32 (step 505) and transmits a facilities seizure request message to the MSCk 32 (step 506). The MSCk 32 transmits a handoff request message to a handoff target BSC (BSCk) 31 (step 507). If a handoff request acknowledge message is received from the BSCk 31 (step 508), the MSCk 32 transmits a handoff proceeding message to the BSCk 31 (step 509). The MSCk 32 transmits a facilities seizure request acknowledge message to the MSCi 12 (step 510) and constructs a new speech path (step 511).

If a handoff request acknowledge message for the third system is received from the MSCi 12 (step 512), the MSCi 22 transmits a handoff command message to the BSCj 21 (step 513) and waits for a facility release request message from the MSCi 12. If a handoff complete message is received from the BSCk 31 (step 514), the MSCk 32 transmits a radio channel seizure message to the MSCi 12 (step 515) and connects a speech path (step 516). The MSCi 12 changes a previous speech path with the MSCj 22 to a new speech path with the MSCk 32 (step 517) and transmits the facility release request message to the MSCj 22 (step 518). Following this, the MSCi 12 restores a trunk (step 519). The MSCj 22 restores a trunk (step 520) and restores a speech path (step 521). The MSCj 22 transmits a traffic channel restore request message to the BSCj 21 (step 522) and transmits a facility release request acknowledge message to the MSCi 12 (step 523). If a traffic channel restore complete message is received from the BSCj 21, the handoff procedure for the third system is completed.

Figure 7:
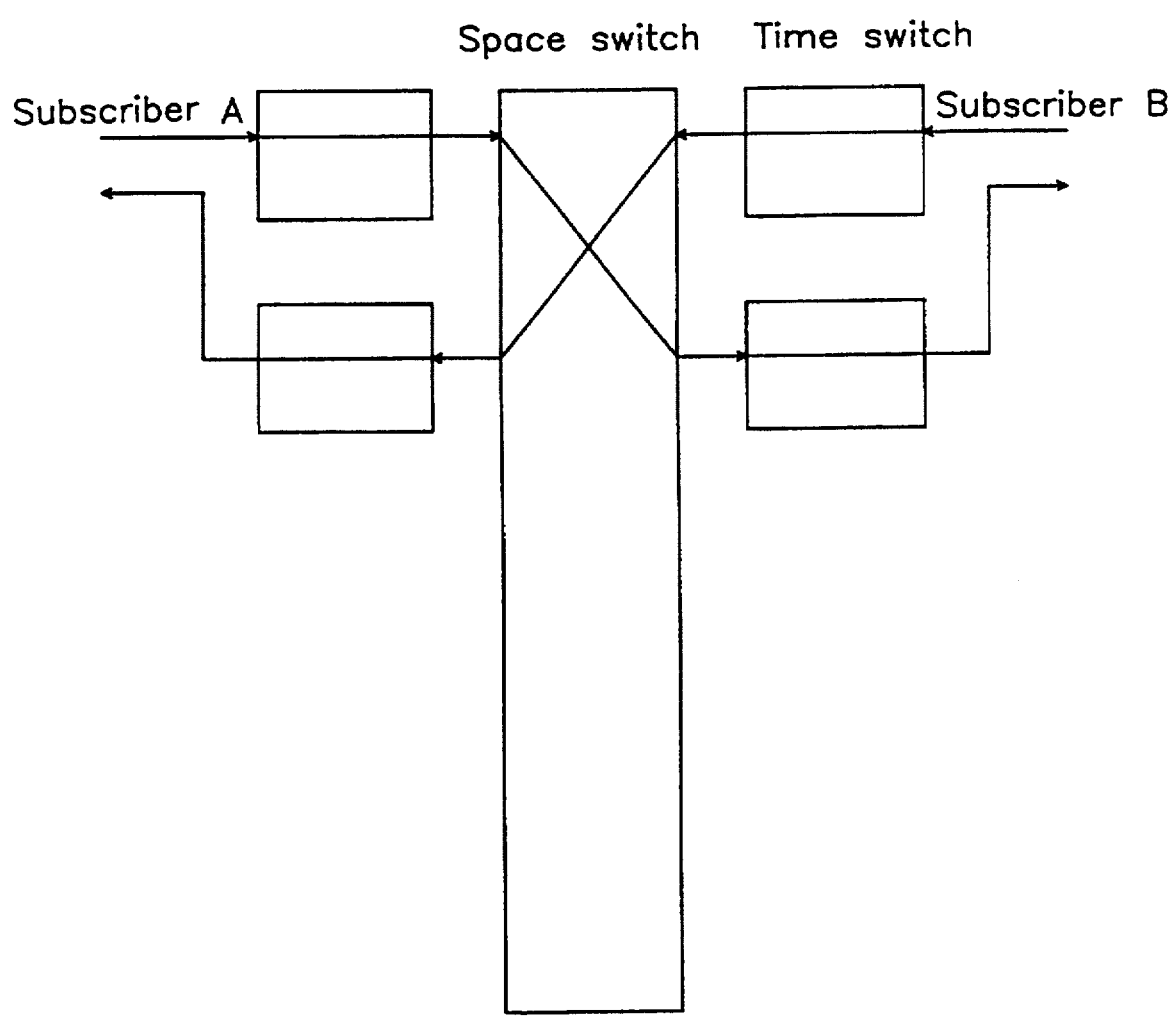
FIG. 7 shows a speech path before the occurrence of handoff.

FIG. 7 shows a speech path constructed with a time switch of a calling subscriber, a space switch and a time switch of a called subscriber before the occurrence of handoff.

Figure 8:
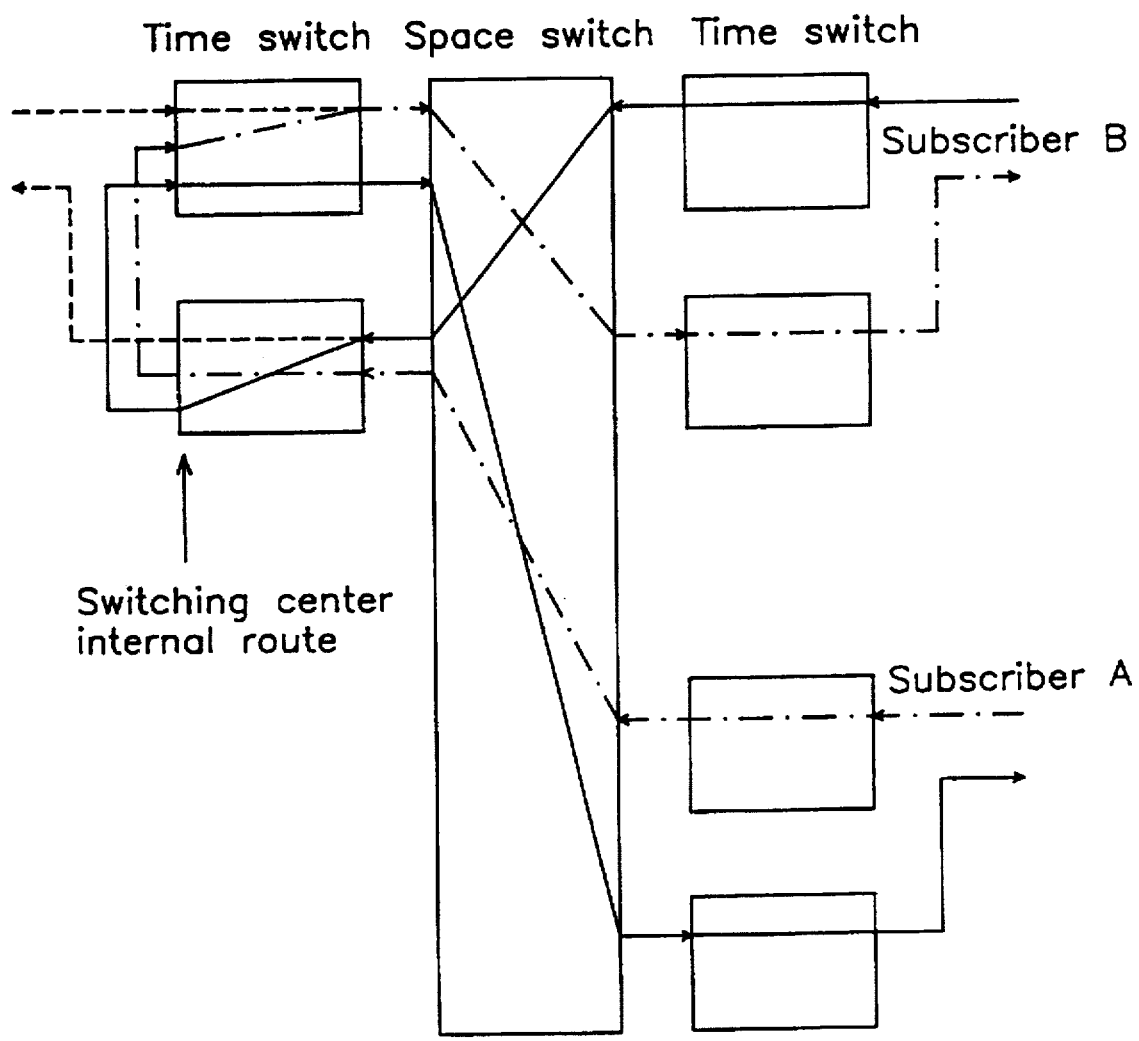
FIG. 8 shows a speech path after the occurrence of handoff.

FIG. 8 shows speech path construction between calling and called subscribers after the occurrence of a handoff.

A front junctor allocated to the time switch of a mobile subscriber A sets a switching center internal route. Hence, a speech path with the other subscriber B is maintained and a new speech path is constructed without having an effect on the space switch or the time switch of the other subscriber B.

As described above, a change to a new speech path is possible without having an effect on the switch of the other subscriber and without lowering speech quality. Further, when performing successive handoff, a speech path can be minimized by processing handoff between an anchor MSC and a final MSC without an intermediate MSC.

While there is shown and described the preferred embodiment of invention, it will be understood by those skilled in the art that foregoing and other changes in form and details may be made without departing from the spirit and scope of the present invention.

What is claimed is:

1. A method for controlling hard-handoff in a CDMA (code division multiple access) mobile switching center according to a handoff request message of a mobile station for shifting a plurality of switching centers in the mobile communication system which applies a code division multiple access method in order to assign the speech channels of the mobile station for dividing the anchor station areas into predetermined cells and shifting each of cells, after dividing wireless speech service areas into predetermined switching center areas and then dividing the switching center areas into predetermined anchor station areas, said method including steps of:

a first step for detecting an original number (target switching center number) of a switching center for managing a target cell of the handoff request message, by a first switching center receiving the handoff request message of which any mobile station generates by shifting from a first switching center area to a second anchor station area, through the corresponding base station;

a second step for converting the speech channel of the mobile station to the second switching center areas by determining that the mobile station shifts from the first anchor station in the first switching center to the second anchor station if the target switching center number detected in said first step is the same as its own switching center number;

a third step for determining the position of the switching center area (anchor station) where the mobile station first opens a speech path if the target switching center number detected in said first step is different from its own switching center original number;

a fourth step for converting the speech channel of the mobile station to the second switching center areas if the first switching center in said third step is determined to be the anchor switching center;

a fifth step for comparing the target switching center number with the anchor switching center number if the first switching center in said third step is not determined to be the anchor switching center;

a sixth step for converting the speech channel of the mobile station to the anchor switching center areas if the target switching center number in said fifth step is the same as that of the anchor switching center; and a seventh step for converting the speech channel of the mobile station to the target switching center areas by directly connecting inner communication paths between the target switching center and the anchor switching center if the target switching center number is different from the anchor switching center number.

2. The method for controlling hard-handoff as claimed in claim 1, wherein said second step includes the steps of:

setting an MSC internal speech path;

transmitting a handoff request message to said second base station;

if a handoff request acknowledge message is received from said second base station and a traffic channel can be set, transmitting a handoff proceeding message to said second base station, constructing a new speech path, and transmitting a handoff command message to the first base station;

if a handoff complete message is received from said second base station, changing a previous speech path to the new speech path; and transmitting a traffic channel restore request message to said service BSC, and if a traffic channel restore complete message is received, terminating a handoff procedure.

3. The method for controlling hard-handoff as claimed in claim 1, wherein said fourth step includes the steps of:

if the generated handoff is an initial handoff, setting an MSC internal speech path, at a service MSC;

seizing a trunk with a handoff target MSC, at said service MSC, and transmitting a facility seizure request message to said target MSC;

transmitting a handoff request message to a handoff target BSC, at said target MSC, and receiving a handoff request acknowledge message from said target BSC;

if a traffic channel can be established, transmitting a handoff proceeding message to said target BSC, at said target MSC, constructing a speech path with said target BSC, and transmitting a facility seizure request acknowledge message to said service MSC;

if said facility seizure request acknowledge message is received, constructing a speech path with said target MSC, at said service MSC, and transmitting a handoff command message to a service BSC which requests handoff;

if a handoff complete message is received from said target BSC, transmitting a radio channel seizure message to said service MSC, at said target MSC, and connecting a speech path with said target BSC; and changing a previous speech path to a new speech path, at said service MSC, transmitting a traffic channel restore request message to said service BSC, and if a traffic channel restore complete message is received, terminating a forward handoff procedure.

4. The method for controlling hard-handoff as claimed in claim 1, wherein said sixth step includes the steps of:

transmitting a backward handoff request message to a handoff target MSC, at a service MSC, transmitting a handoff request message to a handoff target BSC, at said target MSC, if a handoff request acknowledge message is received, transmitting a handoff proceeding message to said target BSC, and constructing a speech path with said target BSC;

if a backward handoff acknowledge message is received from said target MSC, transmitting a handoff command message to a service BSC which requests handoff, at said service MSC;

if a handoff complete message is received from said target BSC, connecting a new speech path at said target MSC, and transmitting a facility release request message to said service MSC;

if said facility release request message is received, restoring a trunk between MSCs, at said service MSC, restoring a speech path with said service BSC, and transmitting a traffic channel restore request message to said service BSC; and transmitting a facility release request acknowledge message to said target MSC, at said service MSC, if a traffic channel restore complete message is received from said service BSC, terminating a backward handoff procedure.

5. The method for controlling hard-handoff as claimed in claim 1, wherein said seventh step includes the steps of:

transmitting a handoff message for a third system to an anchor MSC which sets an initial call, at a service MSC;

seizing a trunk with a handoff target MSC, at said anchor MSC, transmitting a facility seizure request message to said target MSC, transmitting a handoff request message to a handoff target BSC, at said target MSC, and if a handoff request acknowledge message is received from said target BSC, transmitting a handoff proceeding message to said target BSC;

transmitting a facility seizure request acknowledge message to said anchor MSC, at said target MSC, and constructing a new speech path;

if a handoff request acknowledge message for the third system is received from said anchor MSC, transmitting a handoff command message to a service BSC, at said service MSC, and waiting for a facility release request message from said anchor MSC;

if a handoff complete message is received from said target BSC, transmitting a radio channel seizure message to said anchor MSC, at said target MSC, and connecting a speech path;

changing a previous speech path with said service MSC to a new speech path with said target MSC, at said anchor MSC, transmitting said facility release request message to said service MSC, and restoring a trunk;

restoring a trunk, at said service MSC, restoring a speech path, transmitting a traffic channel restore request message to said service BSC, and transmitting a facility release request acknowledge message to said anchor MSC; and if a traffic channel restore complete message is received from said service BSC, terminating a handoff procedure for the third system.

6. The method for controlling hard-handoff as claimed in claims 2 or 3, wherein said MSC internal speech path is set using a front junctor of an access switching subsystem for a mobile subscriber (ASS-M) so as not to have a negative effect on a space switch or a time switch of the other subscriber by maintaining a speech path with the other subscriber.

* * * * *

UNITED STATES PATENT AND TRADEMARK OFFICE
CERTIFICATE OF CORRECTION

| | |
|---|---|
| PATENT NO. | : 5,682,380 |
| APPLICATION NO. | : 08/544737 |
| DATED | : October 28, 1997 |
| INVENTOR(S) | : Hyun-Hwa Park et al. |

It is certified that error appears in the above-identified patent and that said Letters Patent is hereby corrected as shown below:

At claim 1, col. 8, line 55: "switching center" should be changed to -- anchor station--.
At claim 1, col. 8, line 58: "switching center areas" should be changed to -- anchor station area --.
At claim 2, col. 9, line 22: "said" should be changed to -- a --.
At claim 2, col. 9, line 29: "the" should be changed to -- a --.
At claim 2, col. 9, line 34: "said" should be changed to -- a --.

Signed and Sealed this

Twenty-ninth Day of August, 2006

JON W. DUDAS
*Director of the United States Patent and Trademark Office*